No. 767,339. Patented August 9, 1904.

UNITED STATES PATENT OFFICE.

HENRY F. HILLER, OF SOUTH DARTMOUTH, MASSACHUSETTS.

PROCESS OF BRAZING.

SPECIFICATION forming part of Letters Patent No. 767,339, dated August 9, 1904.

Application filed November 2, 1903. Serial No. 179,507. (No specimens.)

*To all whom it may concern:*

Be it known that I, HENRY F. HILLER, a citizen of the United States, residing at South Dartmouth, in the county of Bristol and State of Massachusetts, have invented certain new and useful Improvements in Brazing Compounds and the Application Thereof, of which the following is a specification.

This invention relates to the art of brazing by the use of my improved combination of ingredients in two portions, one dry and one in liquid form, and the method of their application.

My process works equally well for uniting different metals as with like metals and successfully brazes cast-iron.

A description of the process of uniting a broken iron casting will practically illustrate the method used in brazing other metals.

Should the surfaces to be brazed from any cause whatever be greasy, heat the metal until the grease is burned off and then allow it to cool. If the surface is not greasy, simply dust it. The outer edges of the casting beyond the surfaces to be brazed should be cleaned by filing, so that the spelter will adhere to the extreme edge. Apply the liquid mixture to the surfaces to be brazed and allow it to dry. Place the castings in position on the brazing-forge and keep the surfaces to be brazed in even contact by any available method. Direct the flame of the burners upon the joint and heat the metal until it corresponds in color to that of molten spelter, (a small amount of which is placed in the flame from time to time on the spelter-spoon,) when the dry crystals are applied, followed by the spelter, which rapidly enters the joint, completely filling the same, adhering to the surfaces, making a strong and solid union. In like manner cast-iron and steel, wrought-iron and cast-iron, as well as other combinations of metals, may be successfully brazed. The Bunsen-burner process for heating the metals is the most satisfactory, for by that process small pieces of metal are more easily handled than in the open forge and the absence of dirt and cinder is guaranteed. My process consists of, first, the application of the mixture of boracic acid, carbonate of lime, barminic acid, and water, allowing the same to dry; second, the heating of the metal and application of boric-acid crystals; third, the application of brass-copper spelter in chip form. The best form of carbonate of lime and carminic acid for this process is derived from red coral, the two elements being naturally combined therein.

The usual proportion of ingredients for the liquid application is: water, one quart; carbonate of lime, one-eighth of an ounce, and carminic acid, one-eighth of an ounce; but this may be varied, according to the strength of he carbonate of lime and carminic acid.

By this process the cleansing of the surfaces of broken castings is unnecessary unless greasy or rusted, thus saving much time to the operator. The application of the liquid compound before heating the metals is very simple and prepares the surfaces in a thorough manner to receive the crystals and spelter, which enter the joint thoroughly and readily. It is not necessary that the metal after being joined shall cool slowly, but may be cooled by placing in water as soon as the intense glow has left the joint.

This process is so simple and accurate in its working that the operation may be performed by any ordinary mechanic with perfect success.

The proportions of the ingredients used for the compound are as follows: boracic acid, one ounce; corallaceous carbonate of lime and carminic acid, one-fourth of an ounce; water, one quart for the moist portion and boric-acid crystals for the dry portion in equal proportion to the spelter used.

What I claim, and desire to secure by Letters Patent of the United States, is—

1. A process of brazing cast-iron, consisting in applying to the metal to be brazed a mixture of boracic acid, carbonate of lime, carminic acid and water, then heating the metal, then applying thereto boric-acid crystals.

2. A process of brazing consisting in applying to the metal to be brazed a mixture of boracic acid, carbonate of lime, carminic acid and water, then allowing this application to dry, then heating the surfaces of the metal, then applying thereto boric-acid crystals, and spelter.

3. A process of brazing consisting in applying to the metal to be brazed a mixture of boracic acid, carbonate of lime, carminic acid and water, then heating the metal, then applying thereto boric acid.

4. A process of brazing consisting in heating the metal to be brazed, then cooling the metal, then applying to the surfaces to be brazed a mixture of boracic acid, carbonate of lime, carminic acid and water, then allowing the mixture to dry, then heating the metal, then applying thereto boric-acid crystals, then applying brass-copper spelter in chip form.

5. A process of brazing cast-iron, consisting in applying to the metal to be brazed a mixture of boracic acid one ounce, carbonate of lime one-eighth of an ounce, carminic acid one-eighth of an ounce, and water one quart, then heating the metal, then applying thereto boric-acid crystals, then applying brass-copper spelter.

6. A process of brazing similar or dissimilar metals consisting in heating the metal, then cooling the metal, then applying to the metal to be brazed a mixture of boracic acid, carbonate of lime, carminic acid and water, then applying to the metal a heat sufficient to melt a flux and a spelter, then applying a flux and a spelter.

In testimony whereof I affix my signature, in the presence of two witnesses, this 30th day of October, 1903.

HENRY F. HILLER.

Witnesses:
DANIEL W. BAKER,
HARRY E. GIFFORD.